G. W. WOOD.
GUARD.
APPLICATION FILED SEPT. 10, 1913.
1,150,476.
Patented Aug. 17, 1915.
2 SHEETS—SHEET 1.
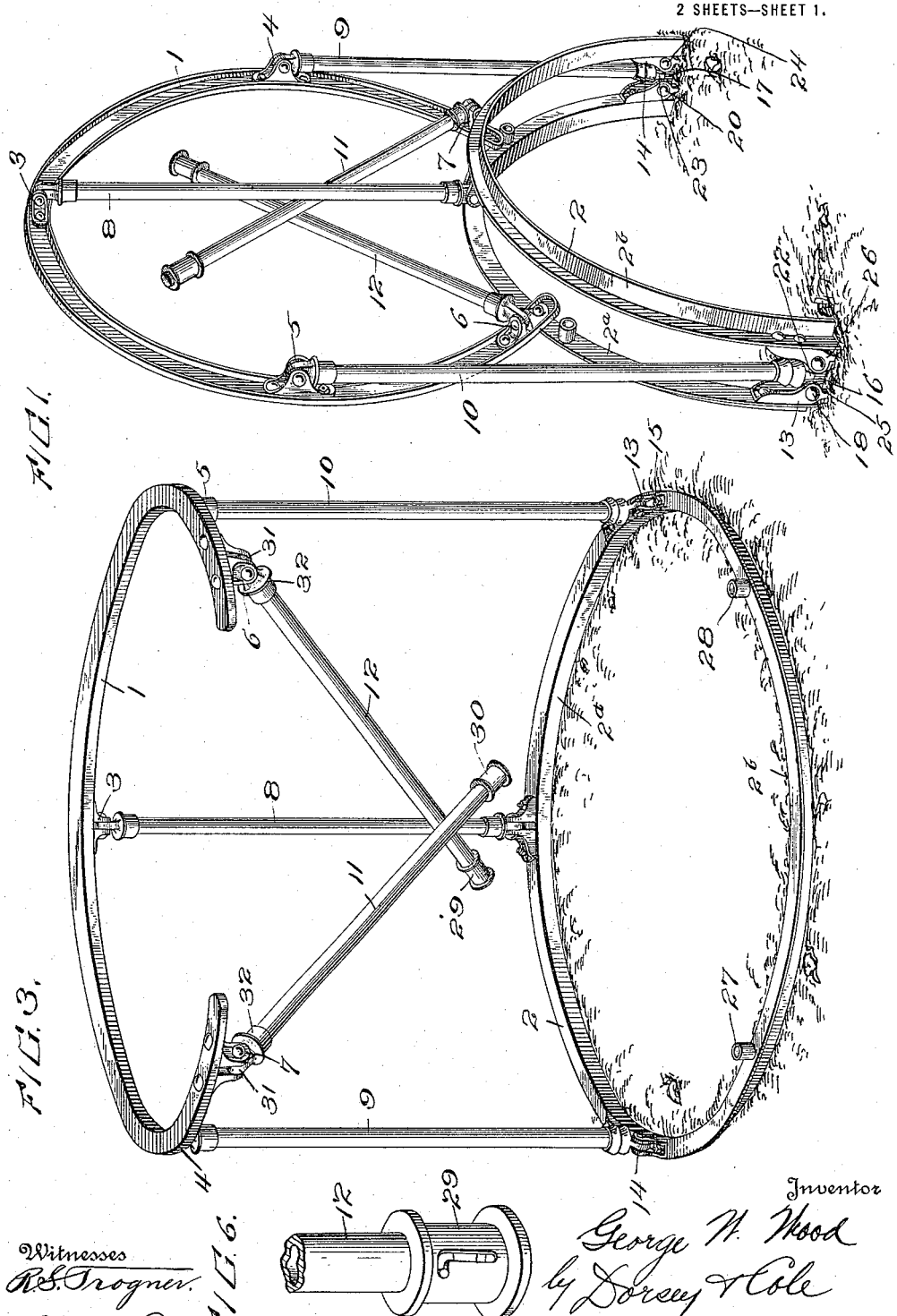
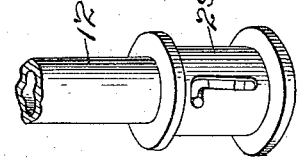
Witnesses
R. S. Trogner.
Albert L. Krey.
Inventor
George W. Wood
by Dorsey & Cole
his Attorneys

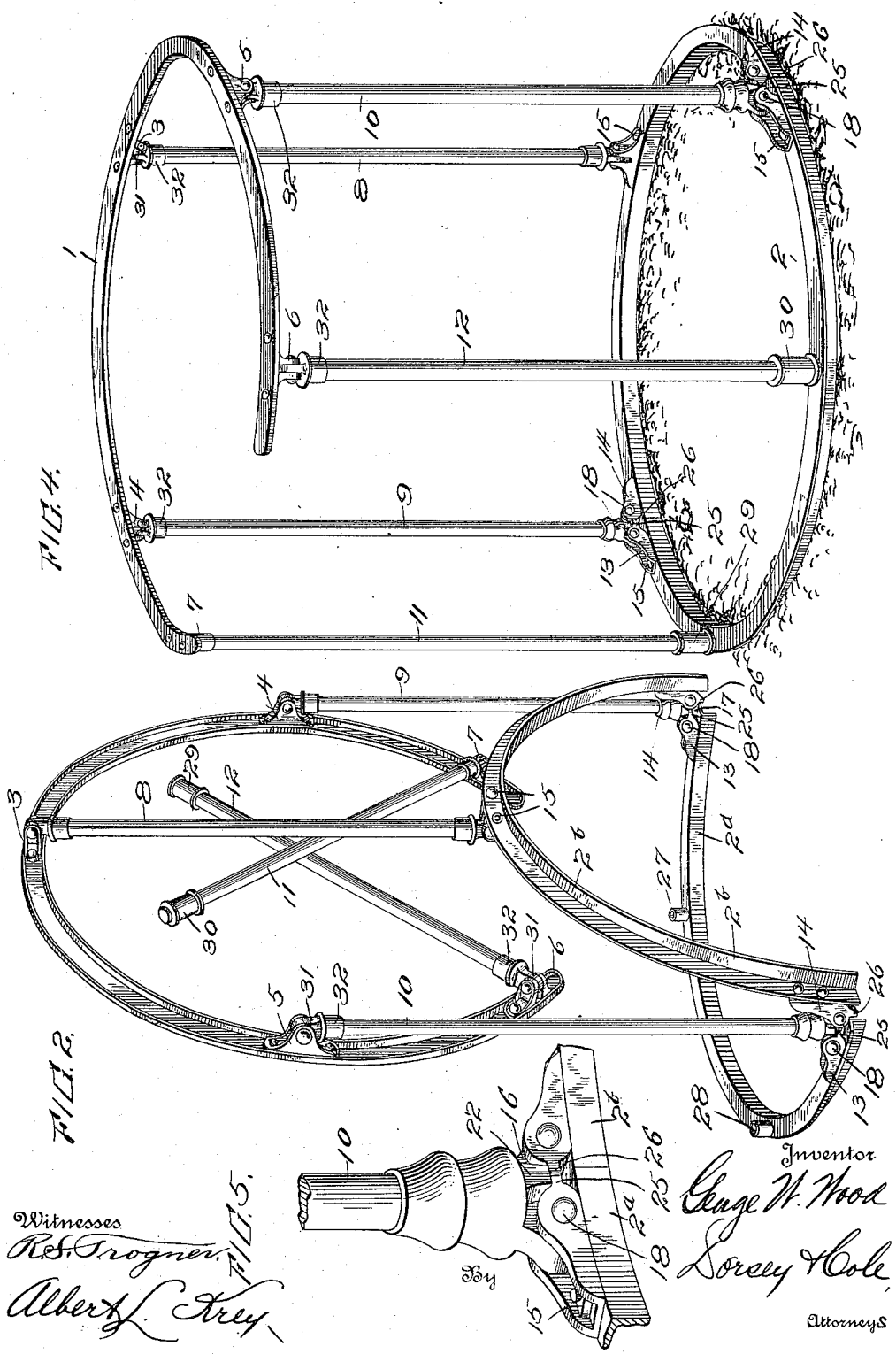

UNITED STATES PATENT OFFICE.

GEORGE W. WOOD, OF SYRACUSE, NEW YORK.

GUARD.

1,150,476. Specification of Letters Patent. Patented Aug. 17, 1915.

Application filed September 10, 1913. Serial No. 789,156.

*To all whom it may concern:*

Be it known that I, GEORGE W. WOOD, a citizen of the United States of America, and a resident of Syracuse, New York, have invented certain new and useful Improvements in Guards, of which the following is a specification.

My invention relates to improvements in guards and primarily to that type of guard to be used in inclosing a man-hole. It may also be used as a guard for young children, and by a slight modification, such as the addition of casters, it may serve as a baby-walker.

The object of my invention is to construct a guard of suitable configuration for its several purposes that may be folded in the most compact manner for transportation and which, when opened and ready for use, will present a rigid barrier.

My invention comprises upper and lower members of suitable configuration to define the guarded space with pivoted supports to hold them in spaced relation when the guard is open, several of the supports at one end thereof being provided with locking means to maintain the guard in an open position when in use.

My invention also embodies other features which will be more fully described and referred to in the accompanying specification.

Referring to the accompanying drawings, in which corresponding parts are designated by corresponding marks of reference, Figure 1 is a perspective view, showing my invention in a closed position, ready for transportation. Fig. 2 is a perspective view of my invention, showing the first movement taken toward opening my device. Fig. 3 is a perspective view of my invention, showing my device fully opened, and the front supports ready to assume their locked position. Fig. 4 is a perspective view of my invention, fully opened and ready for use, the front supports being locked. Fig. 5 is a detail perspective view of the pivotal mounting of the halves of the lower member. Fig. 6 is a detail perspective view of the locking means.

The device as shown comprises an upper member 1 and a lower member 2, the upper member being made of suitable material preferably iron, in channel form, the lower member being formed of angle iron, and divided into two halves 2ª and 2ᵇ. As is shown in the drawings, I have indicated the upper and lower members 1 and 2, respectively, as being annular, but I do not wish to limit myself to that particular shape as the members may be oval, square, rectangular or polygonal in configuration as is preferred. My device, when used as a man-hole guard, has by preference a portion of the upper member 1 cut away to permit access to the man-hole.
On the under side of the upper member 1 are brackets 3, 4, 5, 6 and 7 formed with flared ears and having suitable pivot pins mounted therein, to which are pivotally secured the ears 31 formed on the nipples 32 which nipples are on the upper ends of the supports 8, 9, 10, 11 and 12, these supports, serving to hold when in an open position, the upper and lower members in spaced relation. Open position is referred to as that position the guard assumes when in position over a man-hole and closed position to that position in which the guard is partly or wholly closed and ready for transportation.
Owing to the peculiarity of my construction it is essential that the supports 8, 9 and 10 be located around the upper member 1, and that the pivots thereof be parallel with each other, the pivot of the support 8 being out of the line joining the pivots 9 and 10. The supports 8, 9, and 10 are also pivoted to the lower member 2, in substantially the same manner as they are attached to the upper member. The lower member 2 of my device is of the same configuration as the upper member, the two halves thereof being pivotally jointed together by brackets 13 and 14, attached to each half of the lower member by suitable bolts, indicated at 15.
Mounted on the lower ends of the supports 9 and 10 are nipples terminating in T-heads 16 and 17 through the opposite ends of which transverse pivots 18 and 19, and, 20 and 21 mounted in the outer ends of the brackets 13 and 14, respectively, pass. For the purpose of limiting the downward movement of the halves of the lower member 2 in respect to each other when in an open position, lugs 22 and 23 are formed on the sides of the flared T-heads 16 and 17 above the bottom thereof, which lugs are adapted to engage with projections 25 and 26 on the outer ends of the brackets 13 and 14, respectively.

Mounted on the forward side of the upper face of the lower member 2 are studs 27 and 28 which are adapted to be engaged by sliding collars 29 and 30 slidably mounted by a bayonet joint or a slot and pin connection on the lower ends of the supports 11 and 12, which serve, when positioned and rotated over the projections 27 and 28, to hold the guard in a rigid and locked position.

For the purpose of clearness, the operation of my device may be stated as follows: To open up the guard, the parts being in closed position as shown in Fig. 1, the first movement necessary is to move the forward half 2$^a$ of the lower member 2 downwardly and to a horizontal position. The rear half 2$^b$ of the lower member 2 is then swung downwardly to horizontal position, this downward movement causing a corresponding downward movement to the uppermost rear portion of the upper member 1 and causing that member to assume a horizontal position. The guard has now a position substantially that as shown in Fig. 3, and the last movement necessary to lock the guard in open position is that the supports 11 and 12 be swung outwardly and downwardly on their tangential pivots, and that the sliding collars 29 and 30 on the lower ends of the said supports be shifted downwardly on the pins and over the projections 27 and 28 whereupon the collars on the forward half 2$^a$ of the lower member 2 are turned upon their axes and locked by the annular slots in the collars. When it is desired to close the guard, the collars 29 and 30 are rotated upon their axes and then moved upwardly on the supports 11 and 12, whereby they are disengaged from the projections 27 and 28 on the front half 2$^a$ of the lower member. The supports 11 and 12 are then swung inwardly and the front half 2$^a$ of the lower member 2 is then raised to a vertical position and the rear half 2$^b$ on the lower member is moved to a corresponding position, which movement causes the upper member 1 to assume a vertical position between the front half 2$^a$ and the rear half 2$^b$ of the lower member 2, as is shown in Fig. 1.

Having thus described my invention, what I desire to secure by Letters Patent is:—

1. In a device of the character described, the combination of an upper and lower member, more than two supports pivotally mounted on the upper and lower member and at different points thereon, the said supports having parallel pivots, and supports connecting the upper and lower members locking the said members in a fixed position.

2. In a device of the character described the combination of an upper member and a lower member consisting of two parts pivoted together, supports pivotally mounted on the upper member and to one part of the lower member, and both parts of the lower members, and detachably secured to the other part of the lower member respectively.

3. In a device of the character described the combination of an upper member and a lower member having suitable brackets mounted thereon, a plurality of supports mounted in brackets on the upper and lower members, a support pivoted in a bracket on the upper member, and means mounted on the lower end of the last named support for detachably engaging the lower member and locking the members in open position.

4. In a device of the character described the combination of an upper and a lower member having brackets mounted thereon, of projections mounted on the forward halves of the lower member, of a plurality of supports permanently connected to the upper and lower members by suitable pivots, supports pivoted to the upper member, sliding collars mounted on the lower end of last named supports and having longitudinal and annular slots thereon, and a pin mounted on the support and within the said slots, the said collars being adapted to engage the said projections on the forward half of the lower member.

5. In a device of the character described the combination of an upper member and a lower member consisting of two parts, supports pivotally mounted on the upper member and pivoted to both parts of the lower member, a support pivoted to the upper member and to one half of the lower member, a support pivoted to the upper member, and means for detachably securing the said support to the other part of the first named member.

6. In a device of the character described, the combination of an upper member and a lower member formed in two parts, and supports pivotally mounted on the upper member, several of the supports engaging the individual parts of the lower member, and other of the supports engaging both halves of the lower member.

In testimony whereof I have signed my name.

GEORGE W. WOOD.

Witnesses:
CHAS. E. WASHBURN,
H. A. HAVENS.